United States Patent
Howell

(10) Patent No.: US 6,556,136 B2
(45) Date of Patent: Apr. 29, 2003

(54) METHOD AND APPARATUS FOR USE IN LOCATION OF CONDUCTORS

(76) Inventor: Mark Ian Howell, 23 Windsor Court, Bristol BS8 4LJ (GB)

(*) Notice: Subject to any disclaimer, the term of this patent is extended or adjusted under 35 U.S.C. 154(b) by 0 days.

(21) Appl. No.: 09/873,353

(22) Filed: Jun. 5, 2001

(65) Prior Publication Data

US 2002/0075150 A1 Jun. 20, 2002

(30) Foreign Application Priority Data

Jun. 6, 2000 (GB) .............................................. 0013620

(51) Int. Cl.⁷ ................................................. G08B 21/00
(52) U.S. Cl. .................... 340/540; 340/551; 340/686.1; 324/326
(58) Field of Search .................... 340/540, 686.1, 340/551; 324/326, 345, 327, 328, 329; 343/893

(56) References Cited

U.S. PATENT DOCUMENTS

| | | | |
|---|---|---|---|
| 2,560,834 A | 7/1951 | Whitehead | 175/182 |
| 4,085,360 A | 4/1978 | Howell | 324/3 |
| 4,134,061 A | 1/1979 | Gudgel | 324/54 |
| 4,220,913 A * | 9/1980 | Howell et al. | 324/52 |
| 4,263,553 A | 4/1981 | Cook | 324/327 |
| 4,427,942 A * | 1/1984 | Sole | 324/326 |
| 4,438,389 A | 3/1984 | De Sa | 324/52 |
| 4,639,674 A | 1/1987 | Rippingale | 324/326 |
| 5,134,370 A | 7/1992 | Jefferts | 324/247 |
| 5,321,361 A | 6/1994 | Goodman | 324/326 |
| 5,684,403 A * | 11/1997 | Howell | 324/326 |
| 5,754,049 A * | 5/1998 | Howell | 324/326 |
| 5,764,127 A * | 6/1998 | Hore et al. | 336/143 |
| 5,798,644 A | 8/1998 | Eslambolchi et al. | 324/326 |
| 6,051,977 A | 4/2000 | Masuda et al. | 364/424.05 |
| 6,297,736 B1 * | 10/2001 | Lewis et al. | 340/551 |

FOREIGN PATENT DOCUMENTS

| | | |
|---|---|---|
| EP | 0 732 599 A2 | 9/1996 |
| GB | 2 257 528 A | 1/1993 |
| JP | 4313097 A | 5/1992 |
| JP | 11395437 A | 10/1999 |

* cited by examiner

*Primary Examiner*—Daniel J. Wu
*Assistant Examiner*—Phung Nguyen
(74) *Attorney, Agent, or Firm*—Larson & Taylor, PLC

(57) ABSTRACT

Buried elongate conductors (e.g. pipes and cables) are located using an antenna assembly of ten vertical coils (A–J) arranged in two identical rows (A–E and F–J) arranged one above the other. Currents induced in the coils by alternating currents in buried conductors are fed to signal processing circuitry (12). This calculates parameters whose values can reliably indicate when a conductor is vertically beneath the antenna, and can indicate its depth.

13 Claims, 5 Drawing Sheets

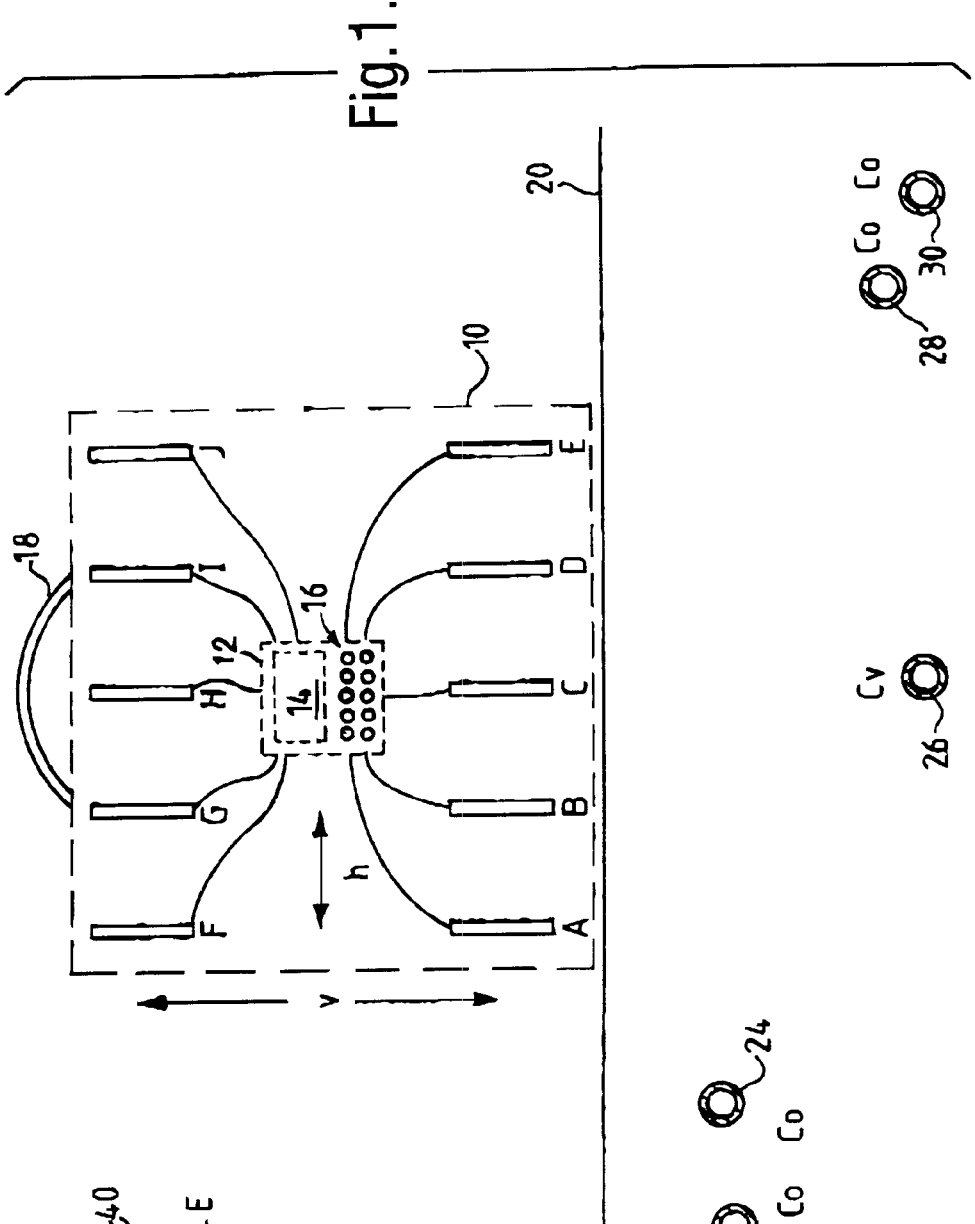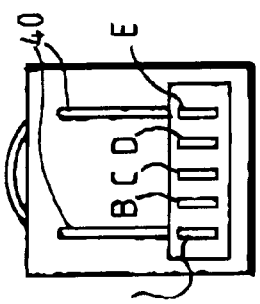

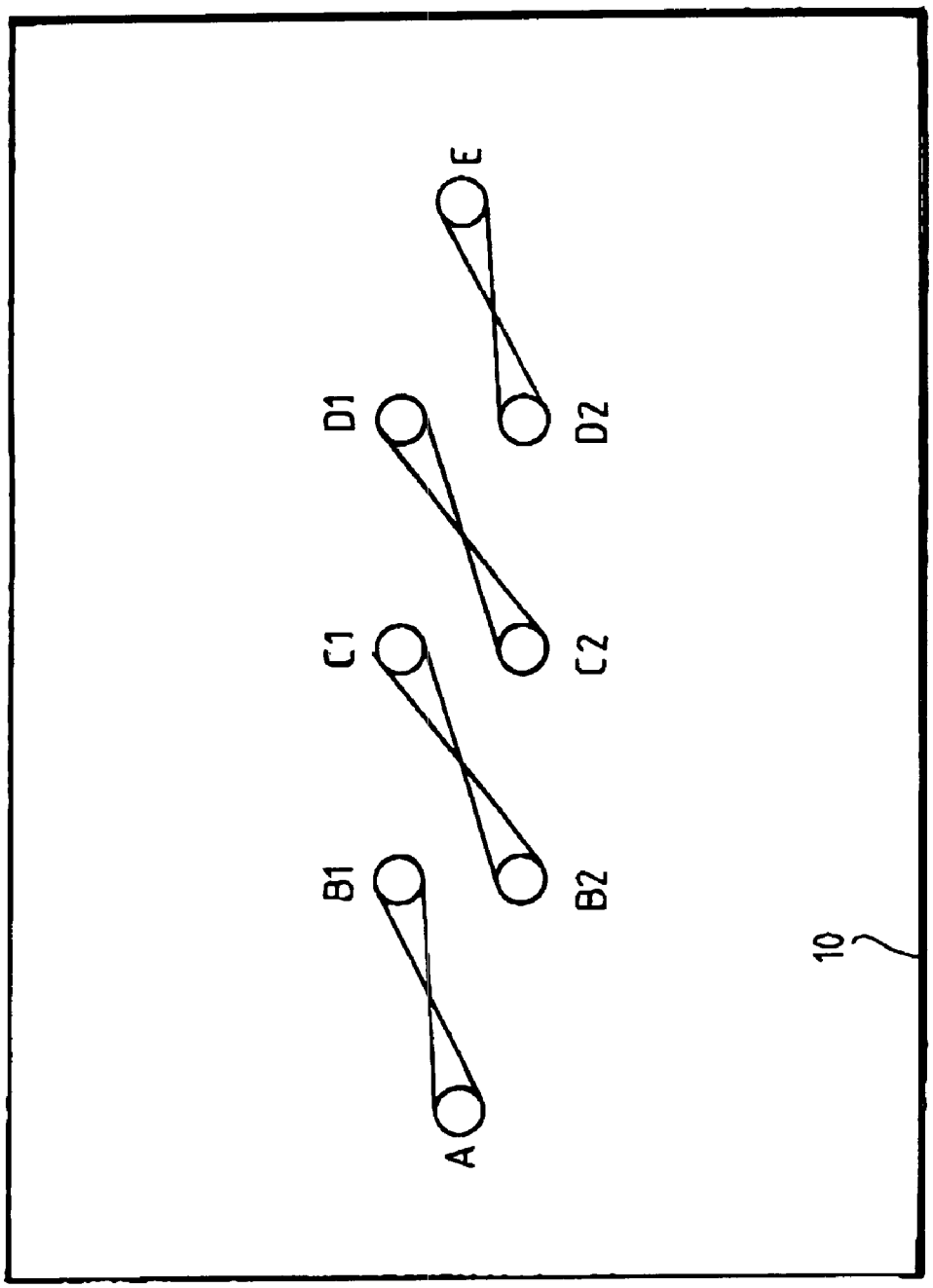

METHOD AND APPARATUS FOR USE IN LOCATION OF CONDUCTORS

BACKGROUND OF THE INVENTION

The present application concerns a method and apparatus for use in the location of elongate conductors, particularly buried conductors, e.g. pipes, cables or other utilities. Instruments currently being marketed can measure the alternating magnetic field due to a buried long conductor that carries alternating current, by measuring currents induced in one or more "search" coils. Depending on the particular instrumental arrangement, maximum or null magnetic field and induced current should indicate that a conductor is directly beneath. However the instruments are unable to distinguish individual conductors, within a combined field resulting from several disparate conductors. Where other conductors lie close to that sought, their currents create a combined field that can give misleading results and lead to false deductions as to conductors' positions. In practice, quite frequently, underground plant or general site safety is imperilled by such inaccurate findings.

SUMMARY OF THE INVENTION

The present invention makes use of the fact that if a coil whose axis is vertical is situated directly over a remote (typically buried) long conductor, it will receive zero induced current from an alternating electric current flowing in that conductor. This is regardless of the current strength in the conductor or the distance between it and the coil. It is this phenomenon that it is proposed be used in the manner of an electrical balance device. On either side of the conductor the induced current in a coil increases equally, but in opposed phase, positively to the right, if negatively to the left, and vice-versa.

The induced current received by a coil of vertical axis is the product of two influences. Firstly, it varies according to the inverse of the distance between the coil and the conductor (measured from the centre of the coil). Secondly, it varies as the cosine of the angle between a horizontal line joining the coil axis (at the coil's centre) to the nearest point vertically above the conductor, and a line joining the coil axis (at the coil's centre) to the conductor axis, perpendicular to the conductor axis. Thus the second factor, and the product of the two factors, are zero where the coil is above the conductor.

According to the invention in a first aspect there is provided an apparatus for use in the location of elongate horizontally extending conductors comprising an antenna comprising a support structure and an array of five substantially identical coils mounted thereto, in a horizontal row, each coil having a linear axis, the coils being arranged so that their axes are vertical and coplanar and with equal linear spacings. Generally the five coils of said array are connected to a signal processing unit so that signal currents induced in the coils can be input to said unit simultaneously for processing thereby.

BRIEF DESCRIPTION OF THE DRAWINGS

Some embodiments of the invention will now be described in greater detail by way of example with reference to the accompanying drawings in which:

FIG. 1 is a schematic view showing an embodiment of the invention in use;

FIG. 2 is a like view on a smaller scale showing a second embodiment;

FIG. 6 shows an alternative coil array in plan view.

FIG. 1 shows an apparatus embodying the invention.

DESCRIPTION OF THE PREFERRED EMBODIMENTS

Figure 3:
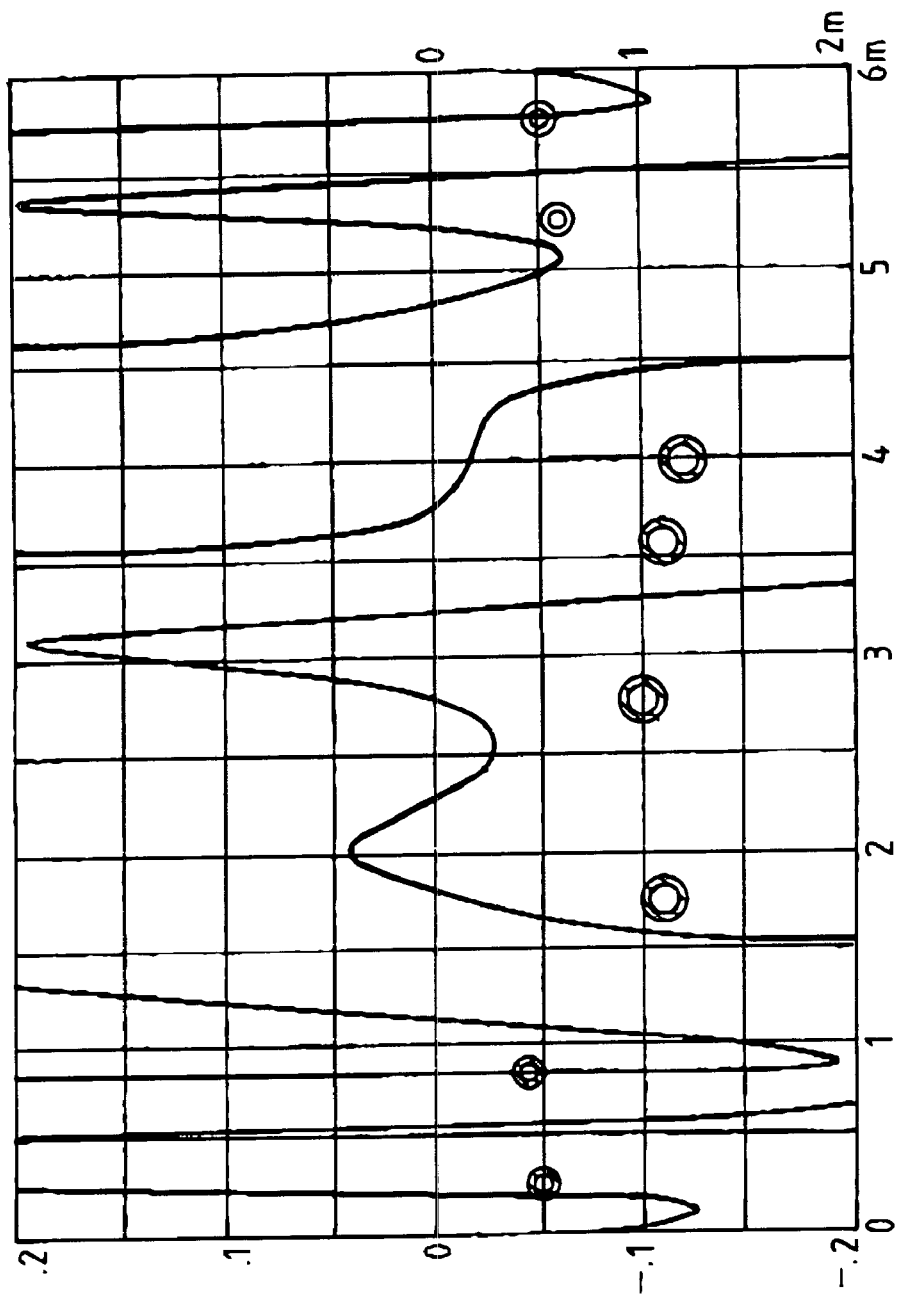
FIG. 3 is a graph showing the variation of an indicator parameter P as the apparatus is traversed across a street having the pattern of buried conductors shown in the lower part.

It has an antenna array composed of ten identical coils A–J mounted to a support structure 10 with their axes vertical and in the same plane. The coils are in a first horizontal array of five coils A–E in line with equal spacings (h) (in this example 10 cm) and a second horizontal array of five coils F–J vertically spaced above the first array with a spacing V (in this example 25 cm), each coil of the second, upper array being directly above a coil of the first, lower array. Each coil is connected to a signal processing unit 12 having a display 14 and control buttons 16. The apparatus is adapted to be traversed across the ground, e.g. by means of a carrying handle 18. FIG. 1 shows the ground surface 20 and, beneath it, five buried elongate conductors 22, 24, 26, 28, 30.

One conductor 26 is directly beneath the central coils C, H.

Two conductors 22, 24 are off to the left and two conductors 28, 30 are off to the right.

A conductor situated directly below the centre of the antenna array, such as conductor 26 in FIG. 1, will be referred to as a "Cv". Any other conductor not vertically below the centre but close enough to influence the total field at the Cv position is referred to as a "Co".

Consider the effects of the conductors on the coils of the first array. At coil B, spaced to the left of central coil C, there will be a signal component due to the combined Co sources, plus or minus a component due to the Cv if there is one at that particular location; and likewise at coil D spaced equally right of C; except that the Cv component there will be adding to the general field, if it is subtracting from it at coil B.

Thus there will be inequality in the amplitudes of the signals left and right of coil C, where the array is centred over a conductor. Where more than one conductor exists nearby, their fields will sum with that of the Cv, from left and right, and at the Cv position theirs will be the only fields that the centre coil will detect. Those fields due to conductors to the left of C will oppose those situated to its right, at the array position itself, leading to a generally low overall level of field intensity at the antenna position, particularly towards the centre of the conductor group. With a Cv present, however, there will exist an appreciable difference in intensity from left to right of the array.

Fourth and fifth coils (coils A and E) added to the array at equal distances from B and D, to theirs from C, perform a special function that makes possible the quantification of the inequality of the field intensity across the array resulting from the existence of a Cv: that is, subtracting from the general field at coils B and A if it is adding to it at coils D and E.

Figure 5:
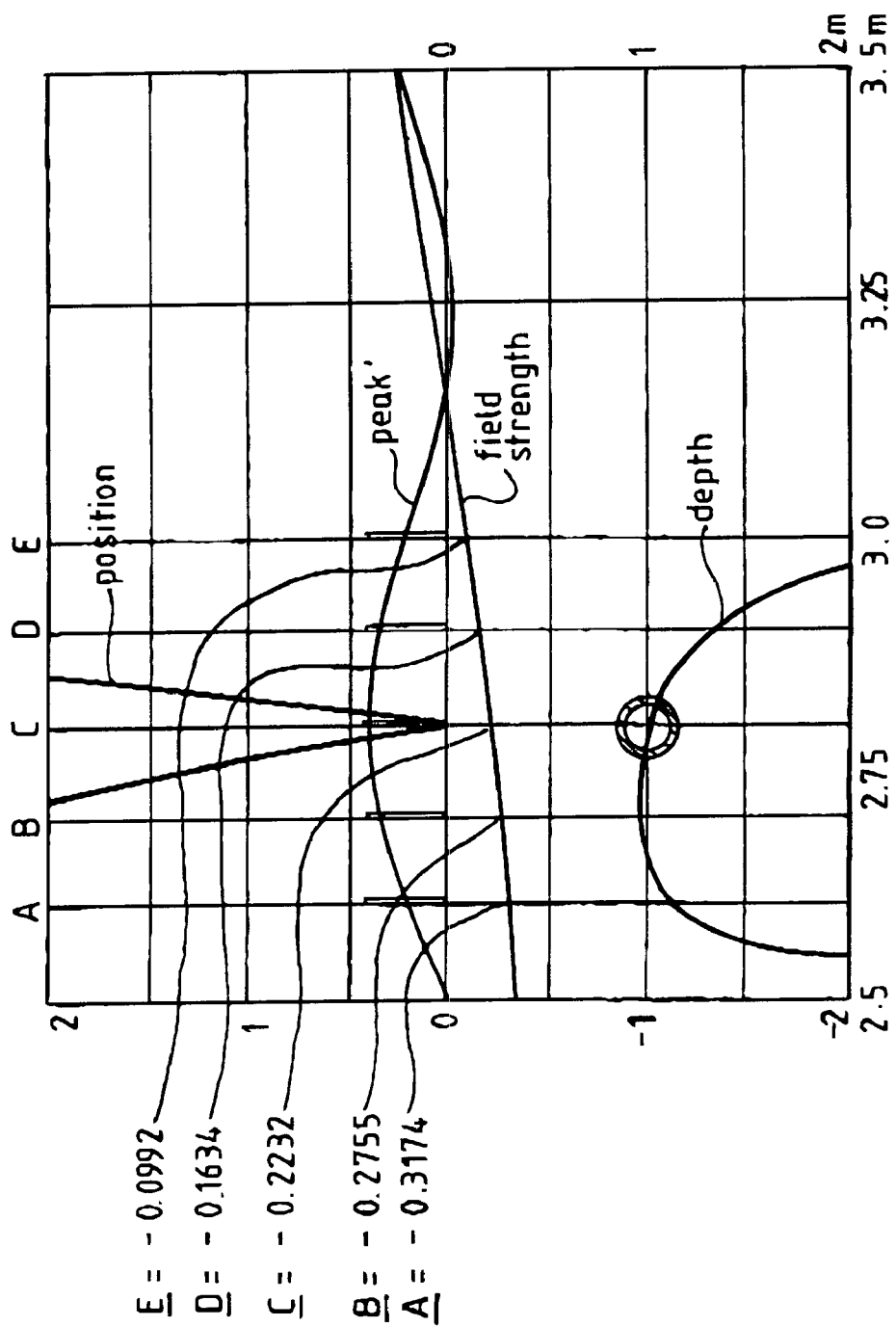
FIG. 5 shows the values of signal strengths of individual coils and other significant variables.

Since the reciprocal-distance component of the Cv field strength remains almost unchanged with a coil's distance from the centre coil at small cosine values (large angles between the horizontal and the line joining the coil to the conductor's closest point), but the cosine component almost exactly doubles with doubling of the distance between central and outer coils at the Cv position, the relationship of the signal magnitudes received at the inner and outer coils of the array offers a practicable method of obtaining a signal giving a "zero-crossing" response as the array passes overhead the Cv. This is because the coils' signals are such that if the parameter $P=[(2\underline{C}-\underline{A}-\underline{E})/4(2\underline{C}-\underline{B}-\underline{D})]-1=0$ (where $\underline{C}, \underline{A}$ etc represent the signal currents induced in coils C, A etc); (Equation 1);

and also:

$(2C-A-E)-4(2C-B-D) \times 0$ the array must be very close to being directly overhead a Cv. It may be noted that although the Cv components of the field are made prominent by reason of their change of phase from left to right across the array in equation 1, those parts of the residual field resulting from the more distant sources and not originating at the Cv are all in-phase, and will cause no sudden contrast across the centre position of the antenna. FIG. 3 shows the variation in P (Equation 1) as the antenna is traversed across the street with the eight conductors shown in the lower part of the figure. In all these graphs, the scale at the right relates to the depth of the conductors. The scale at the left is in arbitrary units. Unity represents the current that would be induced in one of the coils if placed horizontally 1 m above and perpendicular to a long conductor carrying unit current. FIG. 5 shows the values of the constituents of equation 1, A to E, with the antenna central at 2.8 m of the traverse under discussion. "Position" is the value of P (formula 1). 'PEAK' is the value of Q (formula 2, below).

Some spurious cases of zero-crossing occur in the examples given, at 0.56, 1.16, 2.3, 3.22, 4.81, and 5.46 meters of the traverse. This is because momentary points of "balance" in the antenna occur between groups of conductors. These may be eliminated by means discussed below. The other zero-crossings identify conductor positions with high accuracy, also to be discussed in detail below. The exceptions are conductors numbers five and six (counting from the left of FIG. 3) which, spaced only 0.4 meters apart, and at depths of 1.1 and 1.2 meters, cause a zero-crossing to occur nearly mid-way between themselves, thereby achieving a positional accuracy of about ±0.2 m of each of the pair. It is noted here that reducing the current amplitude of conductor number six by one-half results in a shift of the position indicated for the pair of only 49 mm towards conductor five, and a change in the indicated depth of the pair merely from 1.16 m to 0.99 m. This emphasises the considerable stability of the technique in responding to variations of signal current strength and conductor depth. In the survey of FIG. 3, the position results would have allowed no conductor to have escaped discovery in a trench of ordinary width based on a "Position" indication.

The "PEAK" Profile

Figure 4:
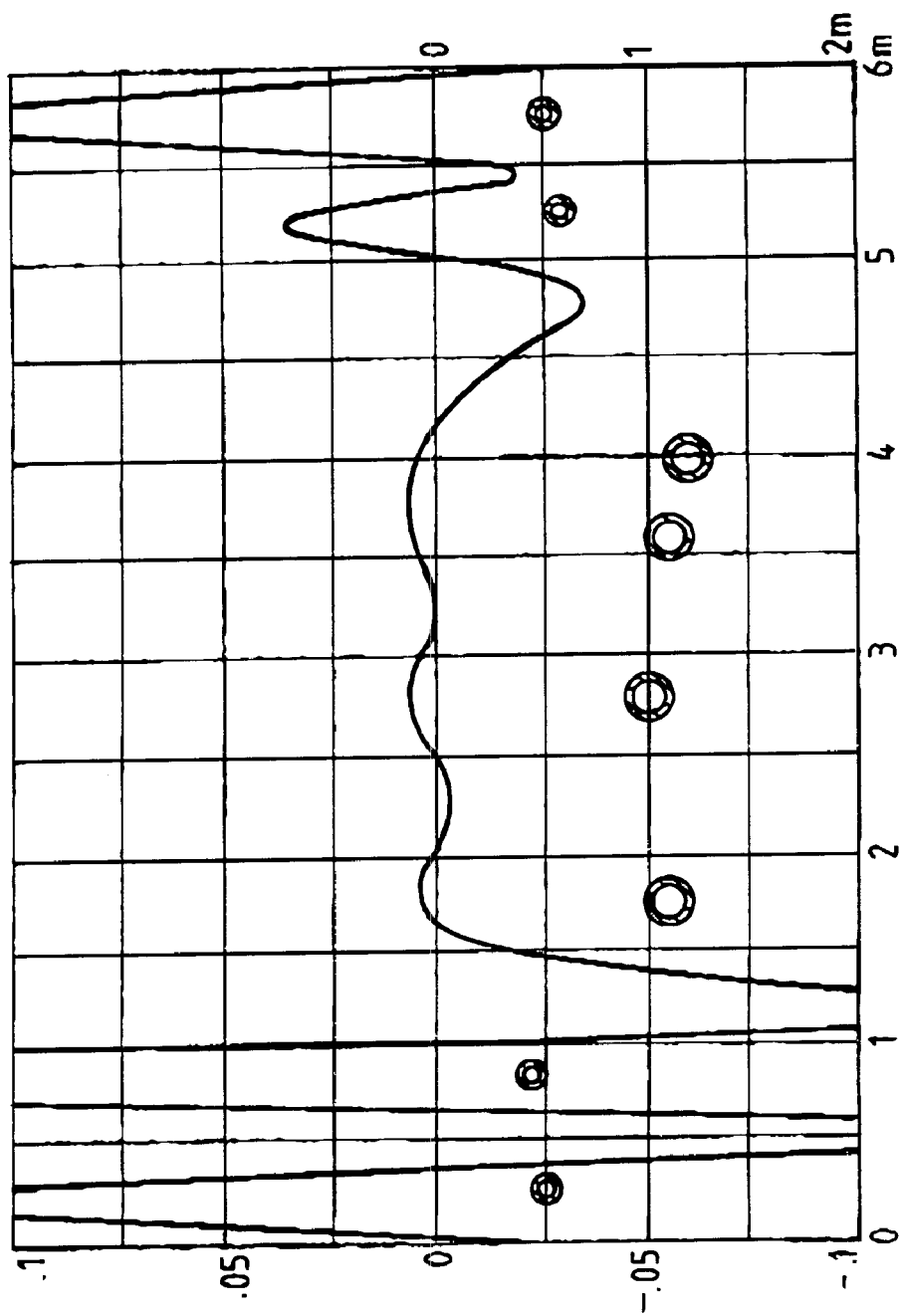
FIG. 4 is a similar graph showing variation of a second indicator parameter Q.

The equation for the zero-crossing indication of position described above may be modified to cause a zero-crossing to occur on either side of a conductor's position, with the signal peaking between, thus (FIG. 4);

$[(A-E)+2(D-B)]=Q$

This equation has two significant applications: first, where a spurious positional indication occurs the polarity of this signal is usually negative, and is positive for a correct response Thus the false zero-crossing indications of position may be discounted. (The true signs of the induced currents of coils A to E may be determined, if necessary, by comparing the phase of coil C with a coil of horizontal axis, and normal in plan to the conductor axis, spaced such that the axis of coil C intersects it; above, below or coaxially.)

Depth of Conductors

Secondly, the depth of conductors as indicated at the "position" response may usually be estimated with good accuracy by employing a second set of five coils F, G, H, I, J placed above the first at a small distance.

If $Q-A-E+2(D-B)$ and $Q'=F-J+2(I-G)$ then $2Q' (Q-Q')$-DEPTH at any POSITION

An alternative to a second set of antenna coils might be to arrange coils A to E to be raised by manual or electrical means on a simple track 40 (FIG. 2) inside the instrument, or possibly to take first and second readings with the height of the instrument raised above the "position" zero-crossing point manually, and the two readings stored for depth computation.

A Hard-Wired Opposed-Phase Array

An alternative to the five coils A to E discussed above may be found in substituting four pairs of coils, each pair wired in opposed-phase and laid out as shown in plan in FIG. 6. The four signals would equate to (A–B), (B–C), and (C–D) and (D–E) already discussed in the equations above. One advantage would be that the input voltage variations would be moderated and the number of calculations necessary reduced; also the inputs to the receiver and processor would be reduced from five to our. A further set of four inputs could provide the depth data.

Noise Reduction by Repetitive Calculation

A single cycle of signal is in theory sufficient to measure the voltages needed to perform the calculations described here; but the opportunity exists to re-perform them over many cycles, even thousands of cycles, in order to reduce noise in signals and circuitry.

Opposed-Phase Pairs Enable Radio or Signal Generator Sources

Because the technique requires opposed-phase coil pairs to be use in all modes of operation, it is able to use either ambient radio energy or a dedicated signal-generator source to search for buried utilities.

Frequency Ranges Suitable for Searching for Buried Utilities

Existing equipments may use switchable frequency bands to enable an instrument to achieve maximum performance when working with different kinds of utilities. This new technique might also be able to benefit from using search frequencies from perhaps below 50 Hz to exceeding 2 MHz.

While the invention has been illustrated above by reference to preferred embodiments, it will be understood by those skilled in the art that various changes and modifications can be made without departing from the spirit and scope of the present invention. It is intended to cover all such changes and modifications by the appended claims.

What is claimed is:

1. Apparatus for use in the location of elongate horizontally extending conductors comprising an antenna comprising a support structure and an array of five substantially identical coils (A, B, C, D, E) mounted thereto, in a horizontal row, each coil having a linear axis, the coils being arranged so that their axes are vertical and coplanar and with equal linear spacings.

2. Apparatus according to claim 1 wherein the five coils of said array are connected to a signal processing unit so that signal currents induced in the coils can be input to said unit simultaneously for processing thereby.

3. Apparatus according to claim 2 wherein the signal processing unit is adapted to perform a calculation with the instantaneous values of the five input signal currents to determine a first indicator parameter whose value is zero when the antenna is directly over an elongate conductor carrying an alternating current.

4. Apparatus according to claim 3 wherein if the signal currents of the coils A, B, C, D and E are termed $\underline{A}$, $\underline{B}$, $\underline{C}$, $\underline{D}$ and $\underline{E}$, then the signal processing unit calculates the value of:

$$[(2\underline{C}-\underline{A}-\underline{E})/]4(2\underline{C}-\underline{B}-\underline{D})]-1=P$$

or $$(2\underline{C}-\underline{A}-\underline{E})-4(2\underline{C}-\underline{B}-\underline{D})=P.$$

5. Apparatus according to claim 3 wherein the signal processing unit is also adapted to-perform a calculation with the instantaneous values of the input signal currents to determine a second indicator parameter Q whose value is at a maximum when the antenna is directly over an elongate conductor carrying an alternating current, and passes through zero if the antenna is moved to either side of the conductor.

6. Apparatus according to claim 5 wherein said second indicator parameter Q is calculated from the formula:

$$Q=\underline{A}-\underline{E}+2(\underline{D}-\underline{B}).$$

7. Apparatus according to claim 1 wherein the support structure is adapted to permit the array of five coils to be moved from a first position to a second position a predetermined distance vertically above the first position.

8. Apparatus according to claim 7 wherein the five coils of said array are connected to a signal processing unit so that signal currents induced in the coils can be input to said unit simultaneously for processing thereby and wherein the signal processing unit is adapted to compare signal currents received in said first and second positions and to determine a value indicative of the depth of a conductor.

9. Apparatus according to claim 8 wherein the signal processing unit is adapted to perform a calculation with the instantaneous values of the signal currents ($\underline{A},\underline{B},\underline{D},\underline{E}$) of the outer coils (A,B,D,E) to determine the value of an indicator parameter $Q=(\underline{A}-\underline{E})+2(\underline{D}-\underline{B})$, and to calculate the respective values $Q_1$ and $Q_2$ of said indicator parameter Q when the array is in said first and second positions and to calculate a depth parameter D from the formula:

$$D=2Q_2/(Q_1-Q_2).$$

10. Apparatus according to claim 1 including a second array of five coils (F, G, H, I, J) identical to the first array and vertically spaced above it.

11. Apparatus according to claim 6 including a second array of five coils (F, G, H, I, J) identical to the first array and vertically spaced above it wherein the signal processing unit is adapted to receive signal currents $\underline{F}$, $\underline{G}$, $\underline{H}$, $\underline{I}$, $\underline{J}$ induced in the coils of the second array, calculate a further indicator parameter Q' from the formula:

$$Q'=\underline{F}-\underline{J}+2(\underline{I}-\underline{G}),$$

and calculate a depth parameter D from the formula:

$$D=2Q'/(Q-Q').$$

12. A modification of the apparatus of claim 1 wherein the or each array of five coils is replaced by four pairs of vertical coils, the coils of each pair being connected in opposite phase so as to provide an output signal indicative of the difference in the currents induced in the two coils of the pair; the pairs being arranged in a horizontal row, with the coils of each pair being horizontally spaced, and each pair having a coil which is adjacent a coil of the neighbouring pair.

13. A method for the location of elongate horizontally extending conductors comprising providing an antenna comprising a support structure and an array of five identical coils (A, B, C, D, E) mounted thereto, in a horizontal row, each coil having a linear axis, the coils being arranged so that their axes are vertical and coplanar and with equal linear spacings, traversing the antenna over the conductors, detecting signals induced in the antenna coils, and processing the signals to provide data indicative of conductor location.

* * * * *